(12) United States Patent
Ye et al.

(10) Patent No.: US 9,372,287 B2
(45) Date of Patent: Jun. 21, 2016

(54) COLORED, DYNAMIC, AND AMPLIFIED SAFETY FILM

(75) Inventors: Yan Ye, Suzhou (CN); Linsen Chen, Suzhou (CN); Su Shen, Suzhou (CN); Yun Zhou, Suzhou (CN); Xiaohong Zhou, Suzhou (CN); Jin Hu, Suzhou (CN); Pengfei Zhu, Suzhou (CN); Donglin Pu, Suzhou (CN); Guojun Wei, Suzhou (CN)

(73) Assignee: Soochow University, Suzhou (CN)

( * ) Notice: Subject to any disclaimer, the term of this patent is extended or adjusted under 35 U.S.C. 154(b) by 48 days.

(21) Appl. No.: 14/419,151

(22) PCT Filed: Aug. 3, 2012

(86) PCT No.: PCT/CN2012/079687
§ 371 (c)(1),
(2), (4) Date: Feb. 2, 2015

(87) PCT Pub. No.: WO2014/019238
PCT Pub. Date: Feb. 6, 2014

(65) Prior Publication Data
US 2015/0198749 A1 Jul. 16, 2015

(51) Int. Cl.
*G02B 27/10* (2006.01)
*G02B 3/00* (2006.01)
*G02B 5/18* (2006.01)
*G02B 5/28* (2006.01)
*G02B 27/12* (2006.01)

(52) U.S. Cl.
CPC ............. *G02B 3/0056* (2013.01); *G02B 5/18* (2013.01); *G02B 5/28* (2013.01); *G02B 5/284* (2013.01); *G02B 27/12* (2013.01)

(58) Field of Classification Search
CPC ............ G02B 5/28; G02B 5/284; G02B 5/18; G02B 3/00; G02B 3/0056; G02B 27/12; G02B 27/0961; G03H 1/00; G03H 1/02; B42D 25/40; B42D 25/355
USPC .................................................. 359/581, 619
See application file for complete search history.

(56) References Cited

U.S. PATENT DOCUMENTS 8,276,945 B2 * 10/2012 Heim ................... B42D 25/355
283/81
2012/0193905 A1 * 8/2012 Schilling ............. G02B 3/0056
283/74

FOREIGN PATENT DOCUMENTS

| CN | 1854944 | 11/2006 |
|---|---|---|
| CN | 1880980 | 12/2006 |
| CN | 101416079 | 4/2009 |
| CN | 100526092 | 8/2009 |
| CN | 101850680 | 10/2010 |
| CN | 102497995 | 6/2012 |

* cited by examiner

*Primary Examiner* — Euncha Cherry
(74) *Attorney, Agent, or Firm* — SZDC Law P.C.

(57) ABSTRACT

A colored, dynamic, and amplified security film includes a micro lens array layer, a base material layer, and a micro graphic layer. The layers meet the condition of Moore amplified imaging; the micro graphic layer is formed by a background area and a graphic area; the graphic area is distributed in the background area; the micro graphic layer includes a semi-transparent and semi-reflective metal layer, a medium layer, and a metal film layer successively from top to bottom; the metal film layer is of a planar structure; the thickness of the medium layer in the graphic area is greater than the thickness of the medium layer in the background area; and the thicknesses of semi-transparent and semi-reflective metal layers are consistent.

8 Claims, 11 Drawing Sheets

COLORED, DYNAMIC, AND AMPLIFIED SAFETY FILM

This application is a National Stage Entry of International Application No. PCT/CN2012/079687, filed Aug. 3, 2012, which is hereby incorporated by reference in its entirety for all purposes as if fully set forth herein.

FIELD OF THE INVENTION

The present invention relates to optical element, and more particularly, to a security film which may show different color dynamic images in an amplified state. It is applied to the field of public security including brand security, cards, tickets, security documents, printing and packaging materials.

BACKGROUND OF THE INVENTION

As cards, tickets, brands of commodities and important documents relate to public security and/or important economic interests, new technologies, new materials and new concepts should be applied in this field to keep the anti-counterfeiting technology ahead of that of counterfeiters. Also, because cards, tickets, commodities are primarily circulated in the public places, one of the main requirements of the optical anti-counterfeiting technology is easy to be identified by the public. Optical variable images based on laser holographic technology is used for security identification on cards, passports, money, bonds, etc., for its obvious visual effect. However, with the popularity of laser holographic technology, the security effect of normal optical variable images gradually reduces.

Micro-optical elements based on Moore amplification principle can amplify micron-scale images in hundreds of times to form millimeter-scale visible images. In the mean time, the presented image will change with the changing of viewing angle, to form a dynamic effect. So it is particularly concerned by the financial field in recent years.

U.S. patents and patent applications U.S. Pat. No. 5,712,731, US2005/0180020A1 and US2008/0037131A1 disclosed to combine micro lens array with micro-graphics array to apply to a security device, wherein the micro-graphics array was made by gravure printing, with a minimum resolution of 5 microns. The main producing method is, coating on flexible films, such as PET, with photoresist, imprinting grooves of several microns depth on the surface of the photoresist using relief plate with micro graphics, filling the grooves with ink by pasting and scratching to let the micro graphics show relative color. In this method of making micro graphics, the color of image is obtained by filling colored ink in the grooves, so the color is mono-color and cannot get colored images; the characteristic size of micro graphics is several microns, while the size of particles of common ink is tens of microns, so, it is required to use special ink with nano-scale particles as the filling color ink; further, in order to let enough ink to be filled into grooves, so as to enhance the contrast between the micro graphics and the background, the groove depth should be deeper than 3 microns, thus, metal imprint templates with large aspect ratio is needed, which resulting in an increase in the difficulty of the process, especially when making large-scale dynamic images.

Another method to make color micro images is with traditional printing way. Luscher's top imaging system JetScreen2000 for large-scale screen and offset printing, for example, has a printhead with 256 nozzles, providing 700 dpi resolution image output; Amanda, a subsidiary of Autoprint Srl., launches a new thermal inkjet printer DigitAll, which can achieve a resolution of 720×720 dpi image output; as for digital screen printing, Scitex's new super wide format printer Grandjet has a resolution of 370×370 dpi; Nur's Fresco printer can achieve a resolution of 720 dpi.

Thus, at the current level of printing technology, 1-2 μm resolution micro graphics cannot be printed, so as not to have the accuracy for Moore amplification. Meanwhile, inefficient printing method can hardly achieve large volume, low cost production of micro graphics.

Chinese Patent CN101850680A discloses a security film with dynamic three-dimensional effect, achieved by random distribution of the center coordinates of each micro lens in the micro lens array layer, a micro lens in the micro lens array layer is set correspondence to a micro graphic in the micro graphic layer. Wherein noted, each micro-graphic can be consisted with micro-nano structures, produced by UV imprint directly implemented on the organic thin film material.

However, financial security products usually required to be observed in ordinary natural light, therefore, easily identifiable visual feature is needed, such as, the dynamic images and pattern background should have high contrast, or the images should have color or grayscale diversification, or also have directed display effect. The micro graphics made by normal nanostructures in CN101850680A, can only add background color through printing, which affects the contrast, so as to be difficult to satisfy the above requirements.

SUMMARY OF THE INVENTION

The object of the present invention is to provide an optical film which can achieve the dynamic effect of color micro graphic image upon color background, meanwhile, to provide the structure and implementation method of dynamic optical film with changing color, to increase the effect of the optical image recognition, so as to improve anti-counterfeiting technology threshold.

This object is achieved according to the technical solution described below:

A colored, dynamic, and amplified security film, which comprises: a micro lens array layer, a base material layer, and a micro graphic layer, said micro graphic layer is formed by a background area and a graphic area, said graphic area is distributed in said background area, said micro graphic layer comprises a semi-transparent and semi-reflective metal layer, a medium layer, and a metal film layer successively from top to bottom, the metal film layer is of a planar structure, the thickness of the medium layer in said graphic area is greater than the thickness of the medium layer in said background area, the thicknesses of semi-transparent and semi-reflective metal layers are consistent and are disposed on upper surfaces of the medium layers in a profiling manner, and embedded on a lower surface of the base material layer, said semi-transparent and semi-reflective metal layer, said medium layer, and said metal film layer form a micro-cavity interference structure.

In above mentioned technical solution, the film is consisted of two parts, one is micro lens array which meets Moore amplification condition, and the other is the micro-cavity interference structure. Color micro graphics based on color background is achieved through micro-cavity interference structure, and enlarged by micro lens array. Micro graphics and micro lens array are arranged to meet the Moore amplification conditions, so as to obtain images magnified hundreds of times, and to achieve dynamic effects such as "floating", "sinking", "deforming", "different images in same position". Background is generated by the micro-cavity interference structure, therefore, a high contrast is obtained between the dynamic images and the pattern background.

In above mentioned technical solution, the thickness of said metal film layer is larger than 20 nanometer, the thickness of said semi-transparent and semi-reflective metal layer is less than 100 nanometer.

Furthermore, a grating structure is set on the upper surface of the medium layer in the graphic area, forming the medium grating layer in the section with grating structure, so as to obtain dynamic changes in optical variable images.

In above mentioned technical solution, in the micro graphic layer, at the area corresponding to each micro lens unit, exists one or more micro graphic unit.

The micro graphic units corresponding to the adjacent micro lens units uses micro-cavity interference structure and nano-grating structure respectively.

Or, the micro graphic units corresponding to the adjacent micro lens units uses micro-cavity interference structure with different cavity thickness or uses nano-grating structure with different parameters.

Or, several micro graphic units corresponding to the micro lens unit uses micro-cavity interference structure and nano-grating structure respectively.

Or, several micro graphic units corresponding to the micro lens unit uses micro-cavity interference structure with different cavity thickness or uses nano-grating structure with different parameters.

Micro image or text consisted of micro-cavity Interference structures are made by nano imprinting and vapor deposition method. The change of the thickness of the micro-cavity interference structure causes the colorization of the micro graphics. Also, micro-cavity interference structure with different thickness may be made on the background layer by same method to achieve different color background with the micro graphics. A preparation method may be, making pit structure corresponding to the shape of the upper surface of the medium layer on the lower surface of the base material layer by micro-nano stamping die head, then depositing a semi-transparent and semi-reflective metal layer, and then plating the medium layer by filling pits and plating to thickness needed, finally, depositing the metal film layer. If necessary, a protective layer may be coated on the metal thin layer's surface.

The security film obtained by above described technical solution, has the visual recognition characters as: (1) the dynamic images have different colors with background; (2) the dynamic images have different colors in different area (change by the thickness of micro-cavity interference structure); (3) the background of the dynamic images has different colors in different area (change by the thickness of micro-cavity interference structure); (4) the background of the dynamic images may be static colored or mono-colored image; (5) by using nanostructure, the color or image of the background has color changing characteristics, showing different colors at different angle rages; (6) by using nanostructure, the color or image of the background of the dynamic images has multi-channel characteristics, showing different colors in different observation plane; (7) by using nanostructure, the color or image of the background of the dynamic images has polarization selectivity, showing different colors under different polarization light; (8) by using nanostructure, different color micro graphic can be observed within same lens unit.

In above-described solution, colors red (R), green (G), blue (B) are obtained respectively through changing thickness of the medium layer, or depth of the medium grating grooves, or parameters of grating structure. With a combination of three unit pixels, respectively R, G, B three-color pixels, and the background layer providing a contrasting color or transparent colorless, the dynamic graphics amplified by micro lens array will have changeable color effect. Said combination includes but is not limited to three units, said colors includes but are not limited to R, G, B three color, said nano structure includes but is not limited to micro-cavity interference structure, and the structure of color scheme or graphics output changeable colors not only through changing parameters of grating structure, but also affected through changing of the polarization state of the incident light, changing of grating orientation or observation plane, or different incidence angle range.

Said layers may be formed in combination with each other, in order to provide dynamic amplified optical film with different color changing.

With applying of the above described technical solution, this invention has the following effects compared with prior art:

1. Micro graphic layer in this invention forms micro-cavity interference structure with at least three-layer structure, so colored micro graphic output can be flexibly obtained through changing thickness of the cavity (medium layer), or changing structure parameter of nano grating. Meanwhile, micro structure made by imprinting has nano-scale precision, so the micro graphics obtained can have 1-2 µm precision. Also, imprinting is an effective means for rapid production of large-scale.

2. The colored output of micro graphics based on micro-cavity interference structure or nano grating in the present invention, can not only meet Moore amplification condition in micro lens array, but also achieve colored, dynamic amplified output of micro graphics with color background. It also meets the need of rapid production; by designing and changing the structure, the optical effect such as "color changing", "different images in same position" can be achieved, so as to significantly improve visual identification features over the prior mono-color security element, to enhance the security features. When making micro-cavity interference structure or nano grating structure for micro graphics, the micro-cavity interference structure of background can be made synchronously, to simplify the process. More importantly, this invention needs the solution such as nano structure making, film interference, setting technical barriers, so providing an important colored viewing solution for optical security film device.

DETAILED DESCRIPTION OF THE EMBODIMENTS

The present invention will be further described below with reference to drawings and examples:

Embodiment 1

Figure 1:
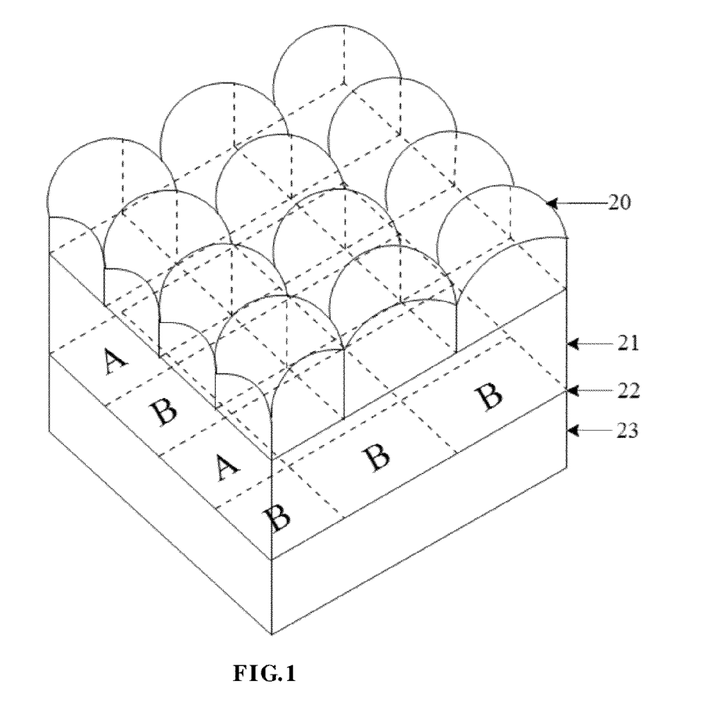
FIG. 1 is a structural schematic view of embodiment 1.

Imprinting a micro-cavity interference filter structure for two colors R, B on the micro graphic area corresponding to the micro lens array, as shown in FIG. 1, 20 is micro lens array layer, 21 is base substance layer, 22 is color micro graphic layer, 23 is color background lay. According to Moore amplified principle, it will form colored, dynamic, and amplified images.

Figure 2:
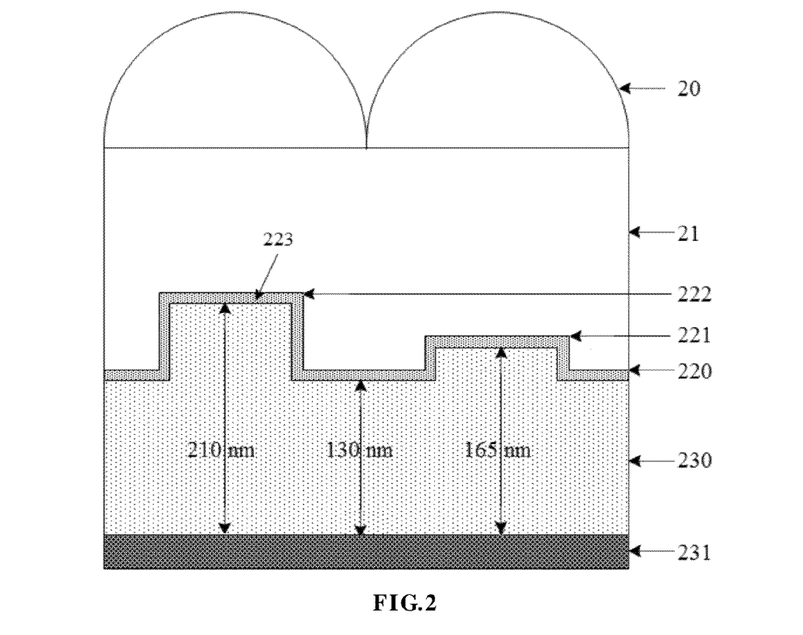
FIG. 2 is a partial cross-sectional view of embodiment 1.

In this embodiment, the sectional view of micro text pixel is shown in FIG. 2, in color micro graphic layer 22, 220 is the lower surface of base substance layer, 221 is horizontal plane where micro text B is on, 222 is horizontal plane where micro text A is on, 223 is semi-transparent and semi-reflective metal layer, which is a nickel film in this embodiment, 230 is a medium filling layer whose index of refraction is 1.5, 231 is a highly reflective metal film layer, which is a metal aluminum layer in this embodiment.

Figure 3:
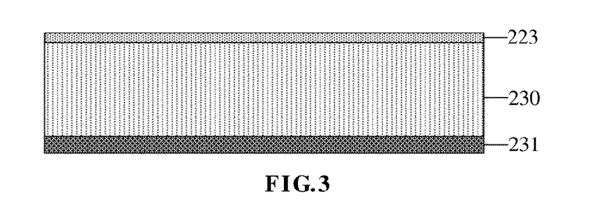
FIG. 3 is a structural schematic view of micro-cavity interference structure in embodiment 1.
Figure 4:
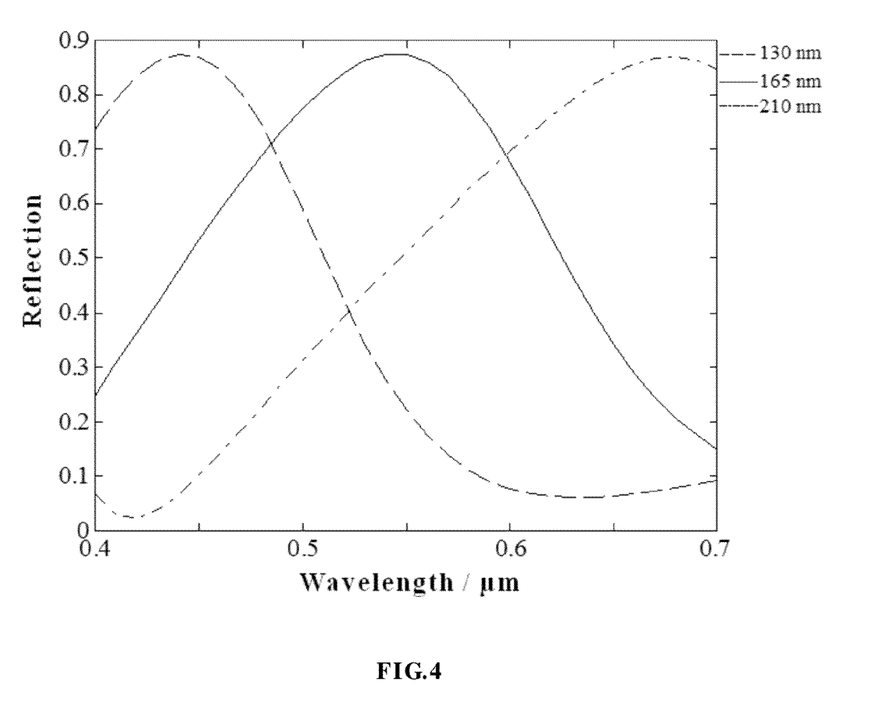
FIG. 4 shows the reflection spectroscopy of Red, Green, Blue in embodiment 1.
Figure 5:
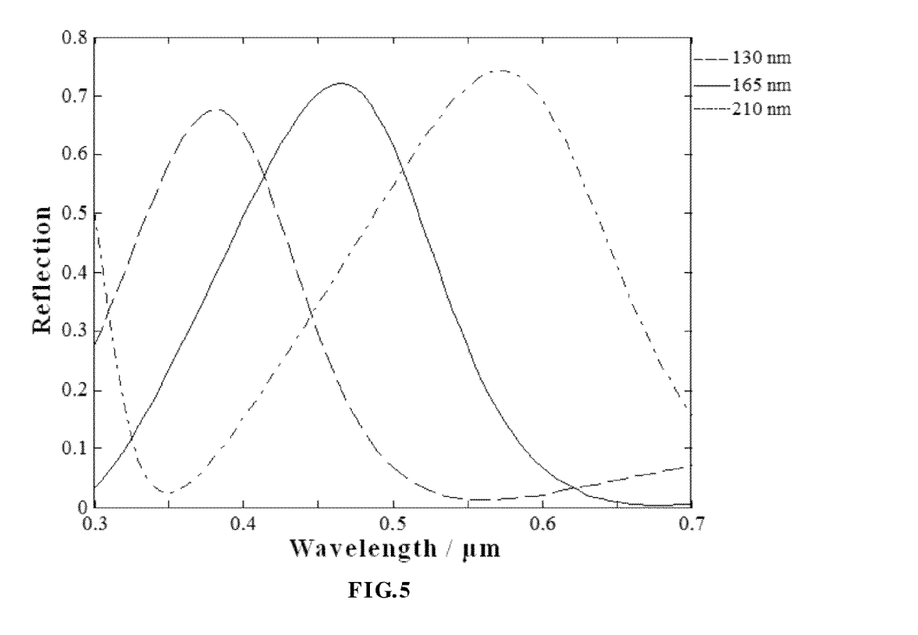
FIG. 5 shows the reflection spectroscopy of Red, Green, Blue in 60°.

The micro-cavity interference structure consisted of color micro graphic layer and color background layer formed in this embodiment is shown in FIG. 3. When 231 is a metal Al film, 230 is a medium whose index of refraction is 1.5, 223 is a metal Ni film, the output of three colors R, G, B can be selected through changing thickness of the micro-cavity 230. As shown in FIG. 2, when thickness of 230 is 210 nm, the reflective light shows red, when thickness of 230 is 165 nm, the reflective light shows green, when thickness of 230 is 130 nm, the reflective light shows blue, the reflection spectroscopy of the three colors are shown in FIG. 4. Under an observation angle of 60°, when thickness of 230 is 210 nm, the reflective light shows yellow, when thickness of 230 is 165 nm, the reflective light shows blue, when thickness of 230 is 130 nm, the reflective light shows purple, as shown in FIG. 5.

Figure 6:
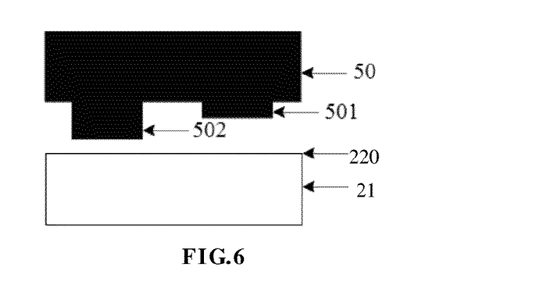
FIG. 6 to FIG. 10 shows the states during each step of imprinting in embodiment 1.
Figure 7:
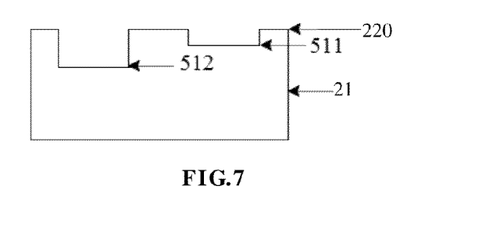
Figure 8:
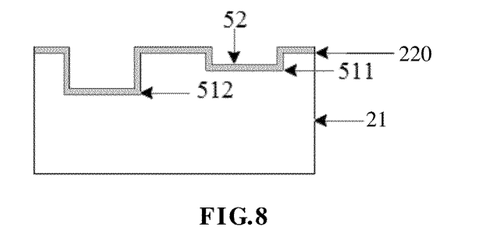
Figure 9:
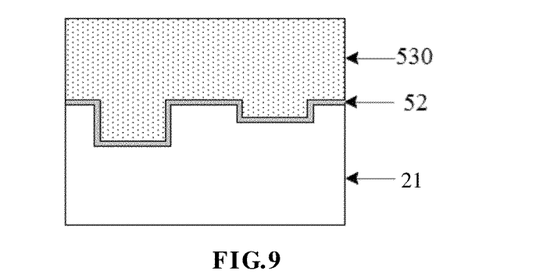
Figure 10:
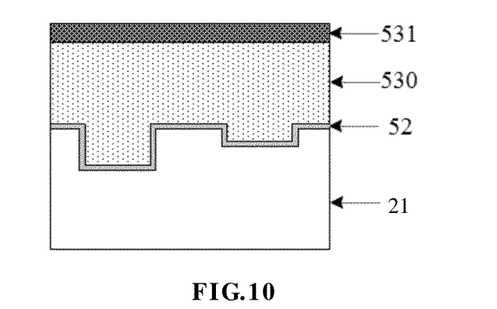

By adjusting the stairs shape of the mold for imprinting micro graphics, the micro-cavity interference structure can be modified to get different cavity thickness for different micro graphics, as shown in FIG. 6 to FIG. 10. As shown in FIG. 6, the imprinting mold 50 has stairs 501 and 502 with different height, so as to imprint two different depth groove on the lower surface 220 of the base substance 21, as shown in FIG. 7, depths of groove 511 and 512 are relatively 45 nm and 90 nm. Then as shown in FIG. 8, a 10 nm layer of nickel film 52 is deposited on it, filling the grooves with medium and coated a 130 nm thick medium layer 530, as shown in FIG. 9, then a 20 nm thick Al film layer 531 is deposited on it, as shown in FIG. 10, finally, coat a protective layer if necessary. Through this solution, the micro-cavity interference structure of background can be obtained simultaneous with the micro-cavity interference structure of micro graphics.

So, in the micro graphic layer, micro text A is formed by 10 nm thick nickel film layer, 210 nm thick medium cavity, and 20 nm thick aluminum film layer, micro text B is formed by 10 nm thick nickel film layer, 165 nm thick medium cavity, and 20 nm thick aluminum film layer relatively, while the background layer is formed by 10 nm thick nickel film layer, 130 nm thick medium cavity, and 20 nm thick aluminum film layer. As a result, when observing in vertical direction, the dynamic amplified images of the micro graphic layer shows red alphabet A and green alphabet B on a blue background; while the viewing angle is 60°, the dynamic amplified images of the micro graphic layer shows yellow alphabet A and blue alphabet B on a purple background.

Embodiment 2

Figure 11:
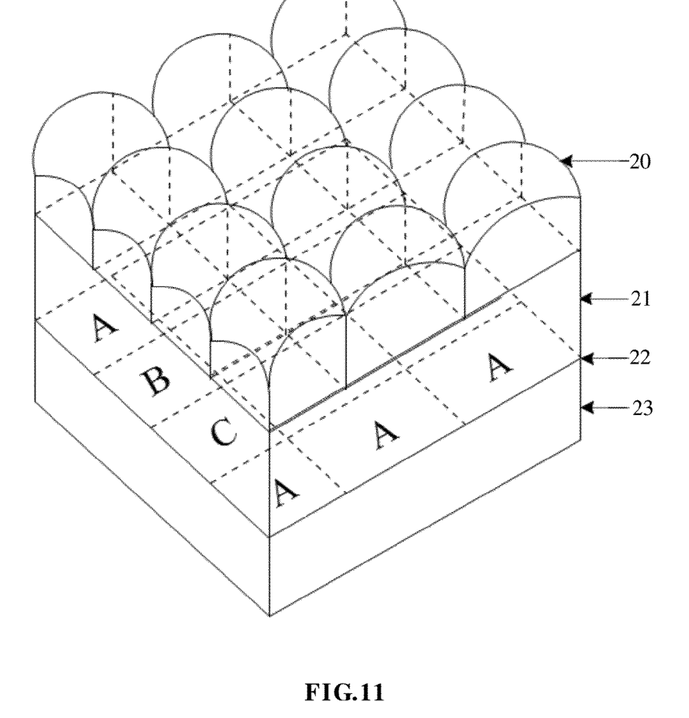
FIG. 11 is a schematic view of embodiment 2.

Imprinting a micro-cavity interference filter structure for three colors R, G, B on the micro graphic area corresponding to the micro lens array, as shown in FIG. 11, 20 is micro lens array layer, 21 is base substance layer, 22 is color micro graphic layer, in which there is a micro text array consisted of alphabets A, B, and C, 23 is colorless background lay. According to Moore amplified principle, it will form colored, dynamic, and amplified images.

Figure 12:
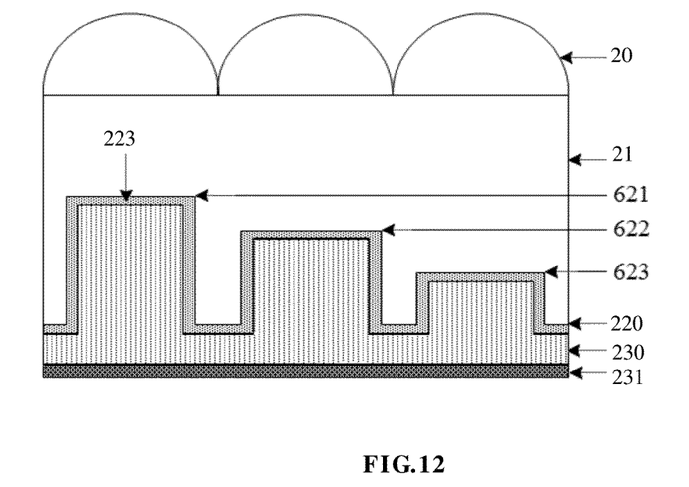
FIG. 12 is a partial cross-sectional view of embodiment 2.

In this embodiment, the sectional view is shown in FIG. 12, in color micro graphic layer 22, 220 is the lower surface of base substance layer, 621 is horizontal plane where micro text A is on, 622 is horizontal plane where micro text B is on, 623 is horizontal plane where micro text C is on, 223 is semi-transparent and semi-reflective metal layer, 230 is a medium filling layer whose index of refraction is 1.49, 231 is a total reflective metal layer.

Figure 13:
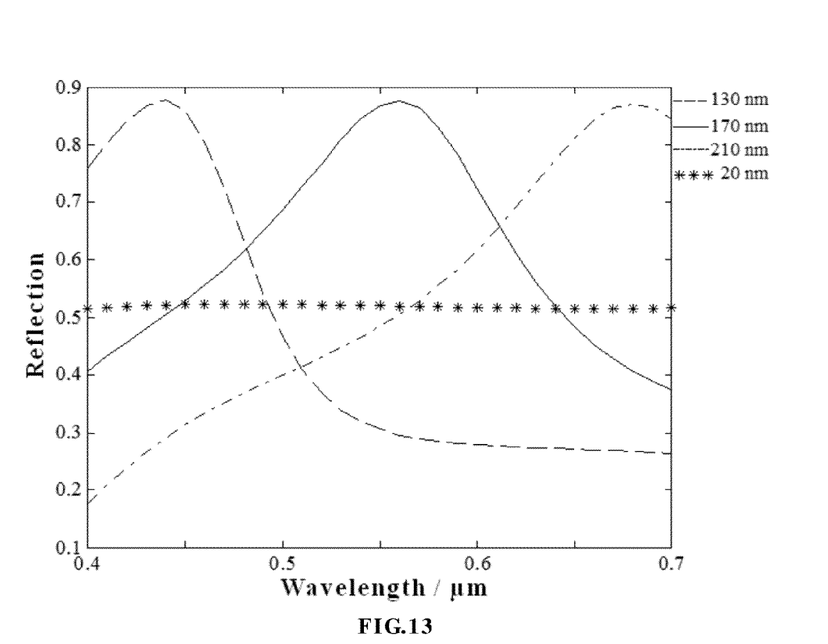
FIG. 13 shows the reflection spectroscopy with four different thickness of the cavity.

Take micro-cavity interference structure for example, when the total reflective metal layer is metal Al film, the medium filling layer uses PMMA with an index of refraction of 1.49, the semi-transparent and semi-reflective metal layer is metal Cr film, the output of three colors R, G, B can be selected through changing thickness of the micro-cavity. When thickness of the micro-cavity is 210 nm, the reflective light shows red, when thickness of the micro-cavity is 170 nm, the reflective light shows green, when thickness of the micro-cavity is 130 nm, the reflective light shows blue, when thickness of the micro-cavity is 20 nm, there are no color being output as reflective light, as shown in FIG. 13. The manufacture method of corresponding micro-cavity interference structure is similar to what is shown in FIG. 6 to FIG. 10, a imprinting mold imprint grooves on the base material with three kinds of groove depths of 196 nm, 156 nm, 116 nm, then depositing a 6 nm thick Cr film, filling the grooves with medium PMMA, depositing a 30 nm thick Al film, finally, coating a protective layer if necessary.

Let micro text A in micro graphic layer be formed by micro-cavity interference structure consisted of 6 nm thick Cr film, 210 nm thick PMMA, and 30 nm thick Al film, micro text B be formed by micro-cavity interference structure consisted of 6 nm thick Cr film, 170 nm thick PMMA, and 30 nm thick Al film, micro text C be formed by micro-cavity interference structure consisted of 6 nm thick Cr film, 130 nm thick PMMA, and 30 nm thick Al film, background layer be formed by micro-cavity interference structure consisted of 6 nm thick Cr film, 20 nm thick PMMA, and 30 nm thick Al film, the dynamic, amplified images in the micro graphic layer show a color text array of red A, green B, and blue C on white background.

Embodiment 3

Figure 14:
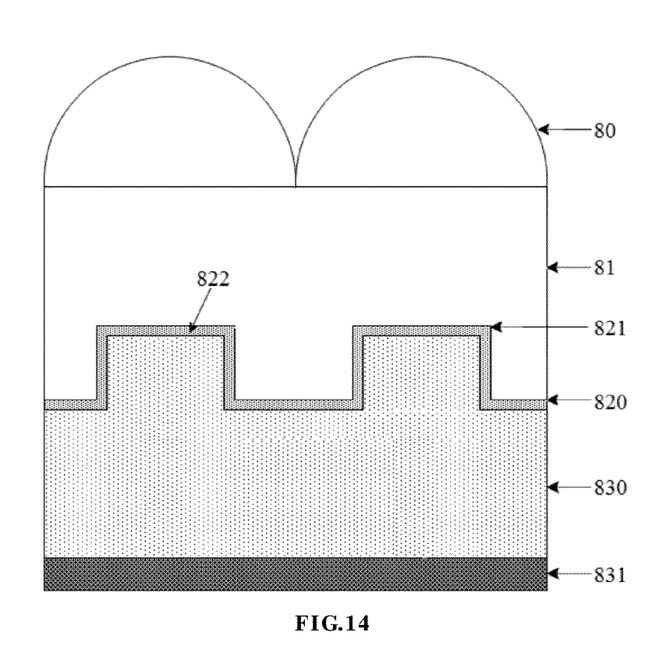
FIG. 14 is a schematic view of embodiment 3.

Getting a micro graphic lay consisted of micro-cavity interference structure of set cavity thickness by imprinting technology, depositing a semi-transparent and semi-reflective metal layer, then filling the imprinting grooves with medium, and then depositing total reflective metal film layer, monocolor micro graphic layer and background layer will be obtained, with different colors of micro graphic layer and background layer. As shown in FIG. 14, imprinting micro graphic 821 with set depth on the lower surface of base substance, coating semi-transparent and semi-reflective metal layer 822, coating medium film layer 830, then coating a total reflective metal film layer 831, then coating a protective layer with medium if necessary. Thus, micro graphic layer and background layer will show mono but different color. Different colors can be selected, for example, dynamic amplified images of micro graphic use shorter wavelength (bluish), while background color uses longer wavelength (reddish), so that the color of dynamic amplified images is different from the color of background, showing blue foreground on red background.

Embodiment 4

By arranging different micro graphics at left and right of the central axis of micro lens, different enlarged image can be observed under different perspective; while adjusting thickness of micro-cavity of left and right micro graphics, the enlarged image will have different colors observed in left or right different field of view.

Figure 15:
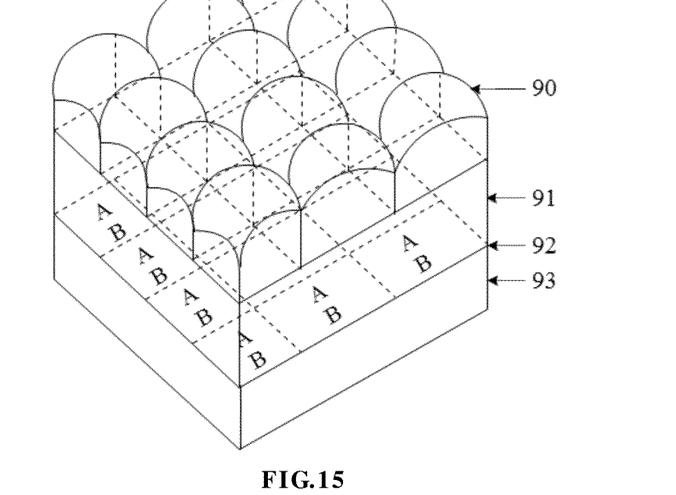
FIG. 15 is a schematic view of embodiment 4.
Figure 16:
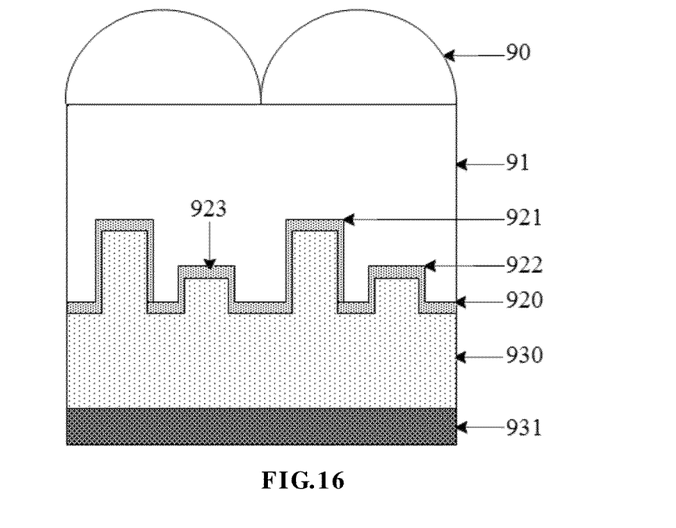
FIG. 16 is a partial cross-sectional view of embodiment 4.

As shown in FIG. 15, at micro graphic area 92 corresponding to micro lens 90, micro graphics A and B are separately arranged at left and right of the central axis of micro lens, whose sectional figure is shown in FIG. 16, on micro graphic layer 92, at left of the central axis of micro lens 921 is the horizon position of micro text A, at right of the central axis of micro lens 921 is the horizon position of micro text B, 923 is a semi-transparent and semi-reflective metal layer, e.g. 6 nm thick nickel film, 930 is medium film layer, e.g. $MgF_2$, 931 is a total reflective metal layer, e.g. 30 nm thick Ag film.

Thus, micro text A, micro text B are separately arranged at left and right of the central axis of micro lens, micro text A, micro text B, and background layer are formed by micro-cavity interference structure with different cavity thickness, the three show different colors. The human eyes observed at the top of the micro lens array will see colored, dynamic, and amplified images of two kind of micro text A and B with the same micro lens unit with same background, and micro text A and micro text B show different colors, showing different images in same position.

Embodiment 5

Figure 17:
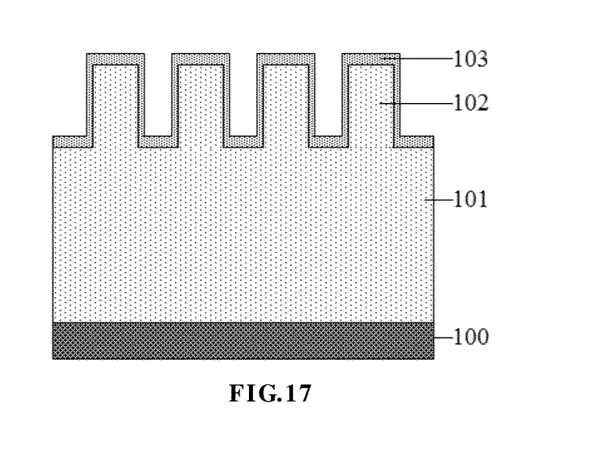
FIG. 17 is a structural schematic view of nano grating.

Realizing color showing of micro graphic layer and background layer at the same time with nano grating structure shown as FIG. 17, wherein 100 is a total reflective metal film, 101 is medium layer, 102 is medium grating, 103 is a semi-transparent and semi-reflective metal layer, in 102, distance between corresponding position of adjacent ridge area is grating period. Output of three colors R, G, B can be achieved by changing thickness of micro cavity 101 and 102.

Figure 18:
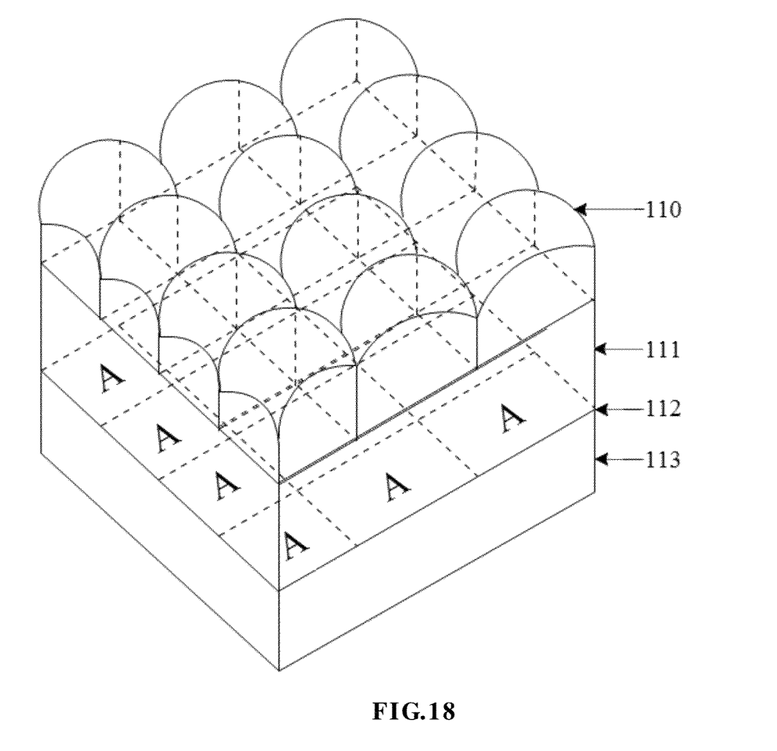
FIG. 18 is a schematic view of embodiment 5.
Figure 19:
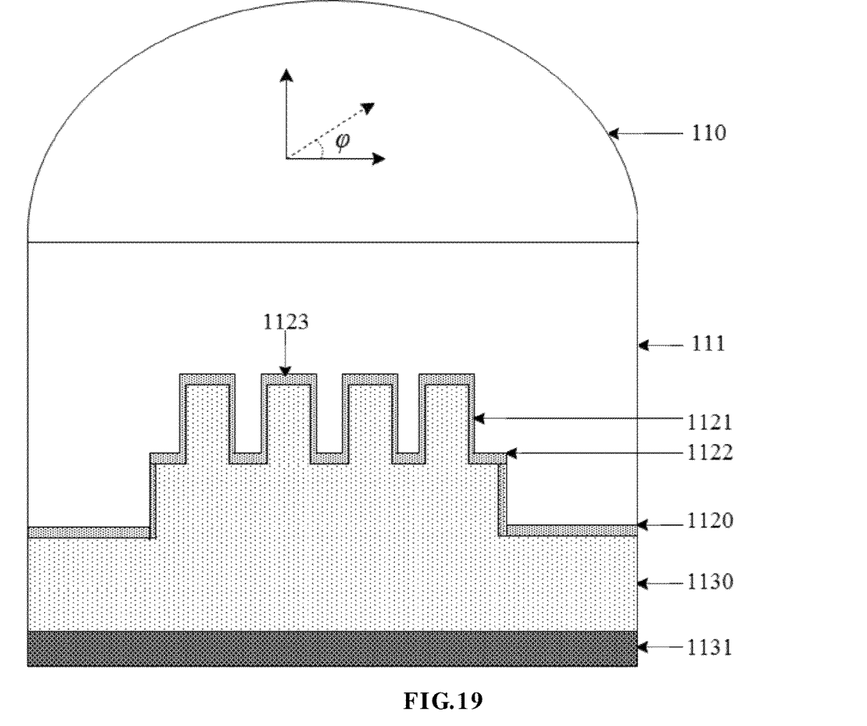
FIG. 19 is a partial cross-sectional view of embodiment 5.
Figure 20:
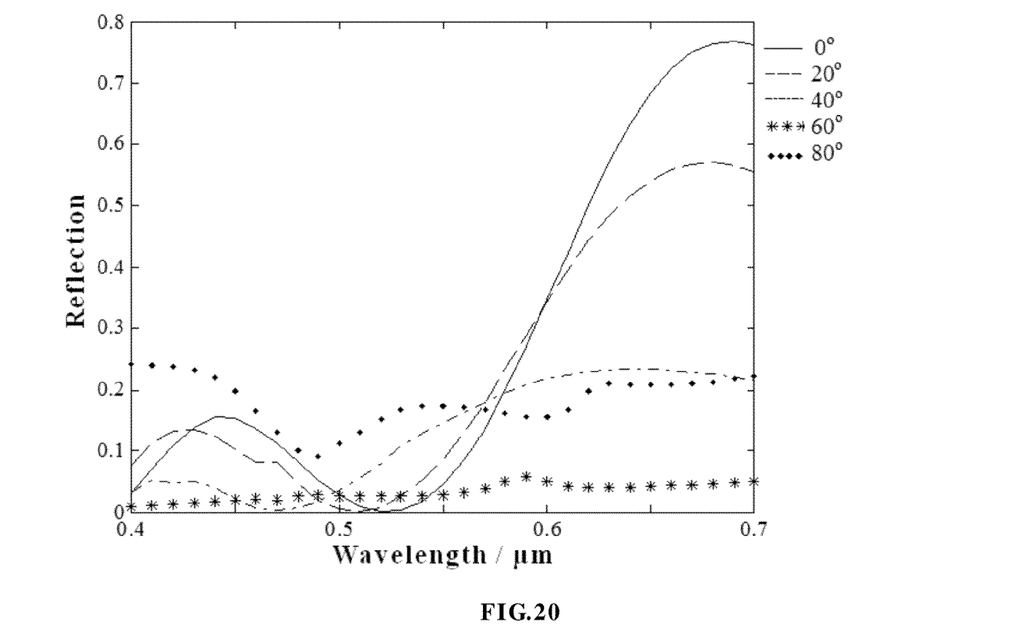
FIG. 20 shows the reflection spectroscopy of nano grating in different viewing angle under TM polarization.
Figure 21:
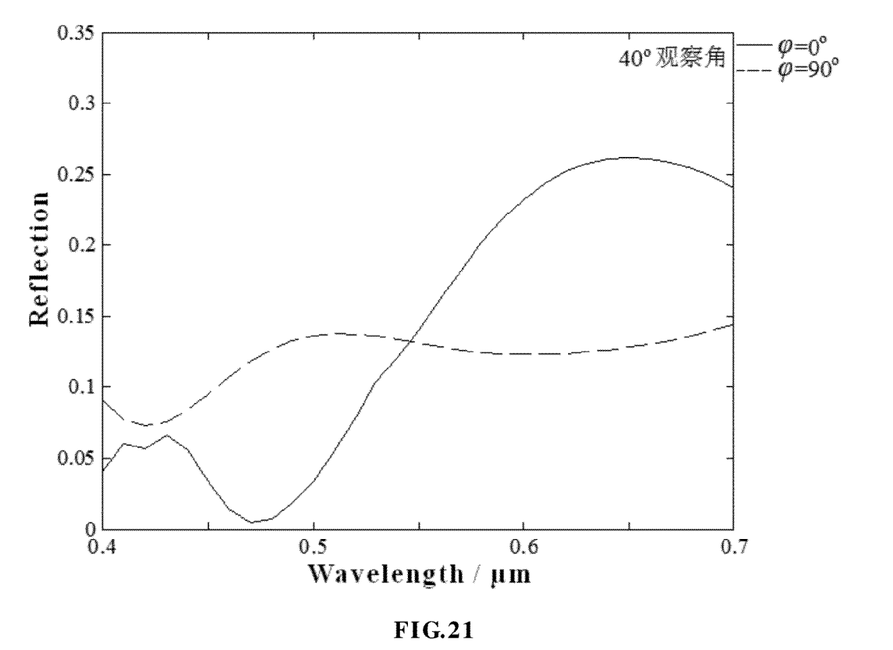
FIG. 21 shows the reflection spectroscopy of nano grating in different observation plane under TM polarization.

Realizing color dynamic amplified showing of micro graphic with color background by combination with micro lens array, is shown as FIG. 18, the sectional figure is shown as FIG. 19, wherein, 1120 is lower surface of base material, imprinting grooves on the lower surface of base material till 1122, width of the groove is less than 5 μm, depth is 65 nm; imprinting medium grating structure 1121 with 250 nm of grating period, and 240 nm of depth on 1122, then coating 10 nm semi-transparent and semi-reflective metal Ni film 1123, 165 nm medium film 1130, and 20 nm total reflective metal film 1131 successively. Thus, micro text A is consisted of 10 nm semi-transparent and semi-reflective metal layer, 230 nm medium grating layer, 230 nm medium layer, and 20 nm total reflective metal film, the reflection spectroscopy under TM polarization is shown as FIG. 20, when observed at ±40°, micro text A shows red; when observed at ±60°, micro text A has no obvious color feature. In the plane perpendicular to the grating's grid lines, (that is φ=0° as in FIG. 19), viewing angle is 40°, micro text A shows red, in the plane parallel to the grating's grid line, (that is φ=90° as in FIG. 19), viewing angle is 40°, micro text A has no obvious color feature, showing apparent two channel feature, as shown in FIG. 21.

Figure 22:
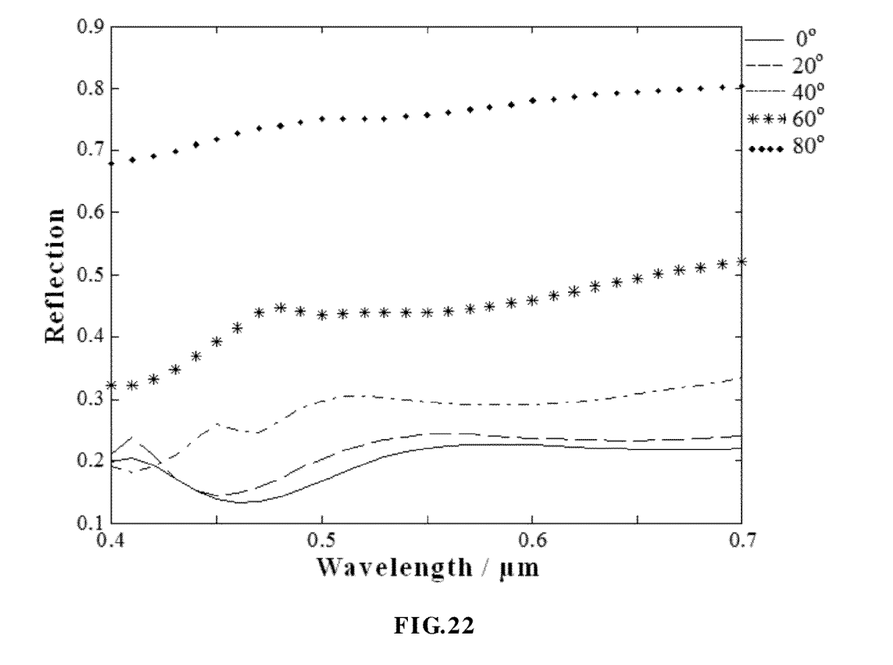
FIG. 22 shows the reflection spectroscopy of nano grating in different viewing angle under TE polarization.
Figure 23:
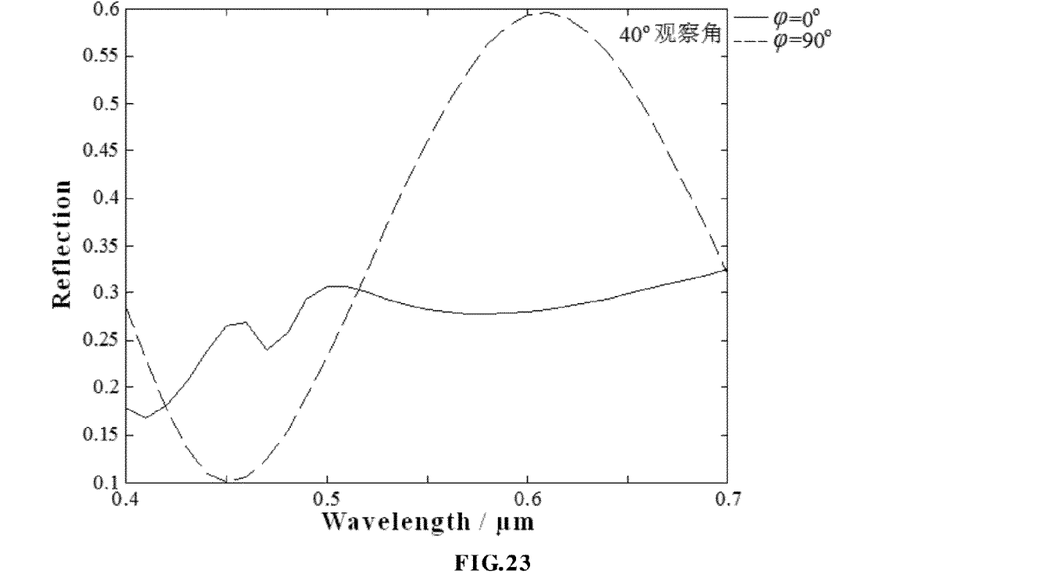
FIG. 23 shows the reflection spectroscopy of nano grating in different observation plane under TE polarization.

The reflection spectroscopy under TE polarization is shown as FIG. 22, in different observation angles, the reflectance in visible area changes little, has no obvious color feature. In the plane perpendicular to the grating's grid lines, (that is φ=0° as in FIG. 19), viewing angle is 40°, micro text A has no obvious color feature, in the plane parallel to the grating's grid line, (that is φ=90° as in FIG. 19), viewing angle is 40°, micro text A shows red, showing apparent two channel feature, as shown in FIG. 23.

Figure 24:
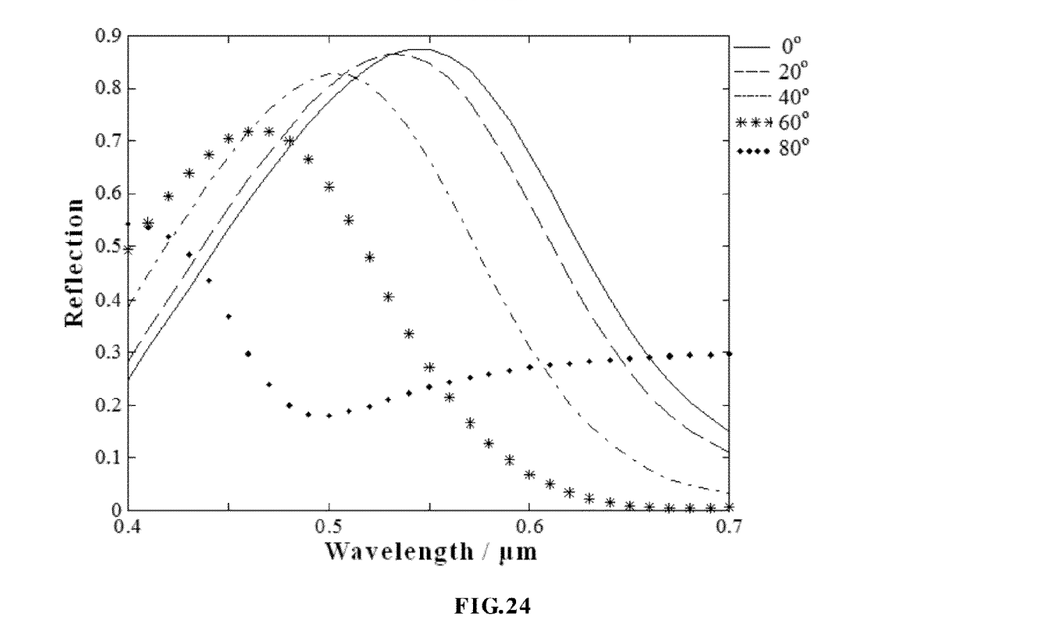
FIG. 24 shows the reflection spectroscopy of micro-cavity interference structure in different viewing angle.

The corresponding background is formed by micro-cavity interference structure consisted of 10 nm semi-transparent and semi-reflective metal layer, 165 nm medium layer, and 20 nm total reflective metal film layer, the reflection spectroscopy is shown as FIG. 24, with the increase of incident angle, color shift from green to blue, when observing vertically, the background shows green; when viewing at 40°, the background shows blue-green; when viewing at 60°, the background shows blue.

In this embodiment, when combining the two, observing vertically shows red text A on green background, observing at 40° shows red text A on blue-green background, observing at 60° shows black text A on blue background.

When observing at 40°, under TM polarization, shows red text A on blue-green background, under TE polarization, shows white text A on blue-green background, showing apparent polarization splitting characteristic.

In the plane perpendicular to the grating's grid lines, observing at 40°, under TM polarization, shows red micro text A on blue-green background, in the plane parallel to the grating's grid line, observing at 40°, under TM polarization, shows white micro text A on blue-green background, showing apparent two channel feature.

Said micro graphics in above embodiments may be all kind of text, image, or the combination of text and image; the color changing character in the embodiments, may combine freely to realize any kind of color changing for dynamic micro graphic with color background.

We claim:
1. A colored, dynamic, and amplified security film, which comprises: a micro lens array layer, a base material layer, and a micro graphic layer, said layers meet the condition of Moore amplified imaging, wherein, said micro graphic layer is formed by a background area and a graphic area, said graphic area is distributed in said background area, said micro graphic layer comprises a semi-transparent and semi-reflective metal layer, a medium layer, and a metal film layer successively from top to bottom, the metal film layer is of a planar structure, the thickness of the medium layer in said graphic area is greater than the thickness of the medium layer in said background area, the thicknesses of semi-transparent and semi-reflective metal layers are consistent and are disposed on upper surfaces of the medium layers in a profiling manner, and embedded on a lower surface of the base material layer, said semi-transparent and semi-reflective metal layer, said medium layer, and said metal film layer form a micro-cavity interference structure.

2. The colored, dynamic, and amplified security film according to claim 1, wherein the thickness of said metal film layer is larger than 20 nanometer, the thickness of said semi-transparent and semi-reflective metal layer is less than 100 nanometer.

3. The colored, dynamic, and amplified security film according to claim 1, wherein a grating structure is set on the upper surface of the medium layer in the graphic area, forming the medium grating layer, said semi-transparent and semi-reflective metal layer, said medium layer, said medium grating layer and said metal film layer constitute the nano-grating structure.

4. The colored, dynamic, and amplified security film according to claim 1, wherein in the micro graphic layer, at the area corresponding to each micro lens unit, exists one or more micro graphic unit.

5. The colored, dynamic, and amplified security film according to claim 4, wherein the micro graphic units corresponding to the adjacent micro lens units uses micro-cavity interference structure and nano-grating structure respectively.

6. The colored, dynamic, and amplified security film according to claim 4, wherein the micro graphic units corresponding to the adjacent micro lens units uses micro-cavity interference structure with different cavity thickness or uses nano-grating structure with different parameters.

7. The colored, dynamic, and amplified security film according to claim 4, wherein several micro graphic units corresponding to the micro lens unit uses micro-cavity interference structure and nano-grating structure respectively.

8. The colored, dynamic, and amplified security film according to claim 4, wherein several micro graphic units corresponding to the micro lens unit uses micro-cavity interference structure with different cavity thickness or uses nano-grating structure with different parameters.

* * * * *